United States Patent [19] [11] Patent Number: 4,906,992
Wingate et al. [45] Date of Patent: Mar. 6, 1990

[54] SINGLE TRACK ABSOLUTE ENCODER

[75] Inventors: Sidney A. Wingate, Concord; Gregory J. Rust, Arlington, both of Mass.

[73] Assignee: Dynamics Research Corporation, Wilmington, Mass.

[21] Appl. No.: 158,319

[22] Filed: Feb. 22, 1988

[51] Int. Cl.[4] .............................................. H03M 1/26
[52] U.S. Cl. ........................................... 341/9; 341/13
[58] Field of Search ............................ 341/8, 9, 13, 15

[56] References Cited

U.S. PATENT DOCUMENTS

| 3,187,187 | 6/1965 | Wingate | 250/233 |
| 3,278,927 | 10/1966 | Vlasenko et al. | 340/347 |
| 3,491,244 | 1/1970 | Stewart, Jr. | 341/9 |
| 3,549,897 | 12/1970 | Blake | 250/231 |
| 4,291,976 | 9/1981 | McMahon | 341/14 |
| 4,412,745 | 11/1983 | Ohtomo et al. | 356/373 |
| 4,628,298 | 12/1986 | Hafle et al. | 341/13 |
| 4,631,519 | 12/1986 | Johnston | 341/13 |
| 4,730,110 | 3/1988 | Spaulding | 341/9 |

Primary Examiner—William M. Shoop, Jr.
Assistant Examiner—Marc S. Hoff
Attorney, Agent, or Firm—Weingarten, Schurgin, Gagnebin & Hayes

[57] ABSTRACT

An absolute encoder providing a multi-bit output binary code indicative of the position of a rotary or linear scale. The encoder employs a code track, which contains a serial code, and a clock track. The encoder may be either rotary or linear, and may be implemented optically, magnetically, inductively, capacitatively or by any other binary sensing technique.

12 Claims, 2 Drawing Sheets

SINGLE TRACK ABSOLUTE ENCODER

FIELD OF THE INVENTION

This invention relates in general to absolute encoders, and more particularly, to an absolute encoder having a code track and providing an output signal indicative of the precise position of a rotary or linear scale.

BACKGROUND OF THE INVENTION

Absolute encoders are known for providing an output indication of the position of a sensing head relative to a measuring scale. For sensing rotary displacement, the scale is in the form of a disc rotating a plurality of concentric tracks which provide respective bits of a multi-bit digital code. For linear rotation sensing, the scale is an elongated scale member containing linearly arranged parallel code tracks. The rotary code tracks are sensed by an array of sensors each concentric with a respective track to provide an output signal representing a bit of the multi-bit output code. The code tracks are often formed of optically responsive segments, which segments are light transmissive or light reflective, but the tracks can alternatively be of other forms such as magnetic, capacitive or inductive. Higher resolution is achieved by increasing the number of code tracks to provide a higher number of bits in the output code.

SUMMARY OF THE INVENTION

Broadly speaking, the present invention provides an absolute encoder having a code track and a clock track. The code track is encoded with a serial code which is unique for each increment that the disc rotates. That is, for a code of N-bits, each N adjacent bits represent a unique N-bit word. Such a code is sometimes defined as a shift register code. The invention can be embodied in a rotary or linear encoder to sense relative angular or linear movement, respectively.

DESCRIPTION OF THE DRAWINGS

The invention will be more fully understood from the following detailed description, taken in conjunction with the accompanying drawings, in which.

DESCRIPTION OF THE PREFERRED EMBODIMENT

With reference now to the drawings, there is shown the preferred embodiment of an absolute encoder of the present invention. While the present invention may be either a rotary encoder or a linear encoder, the present description will describe a rotary encoder having a disc 10.

Figure 1:
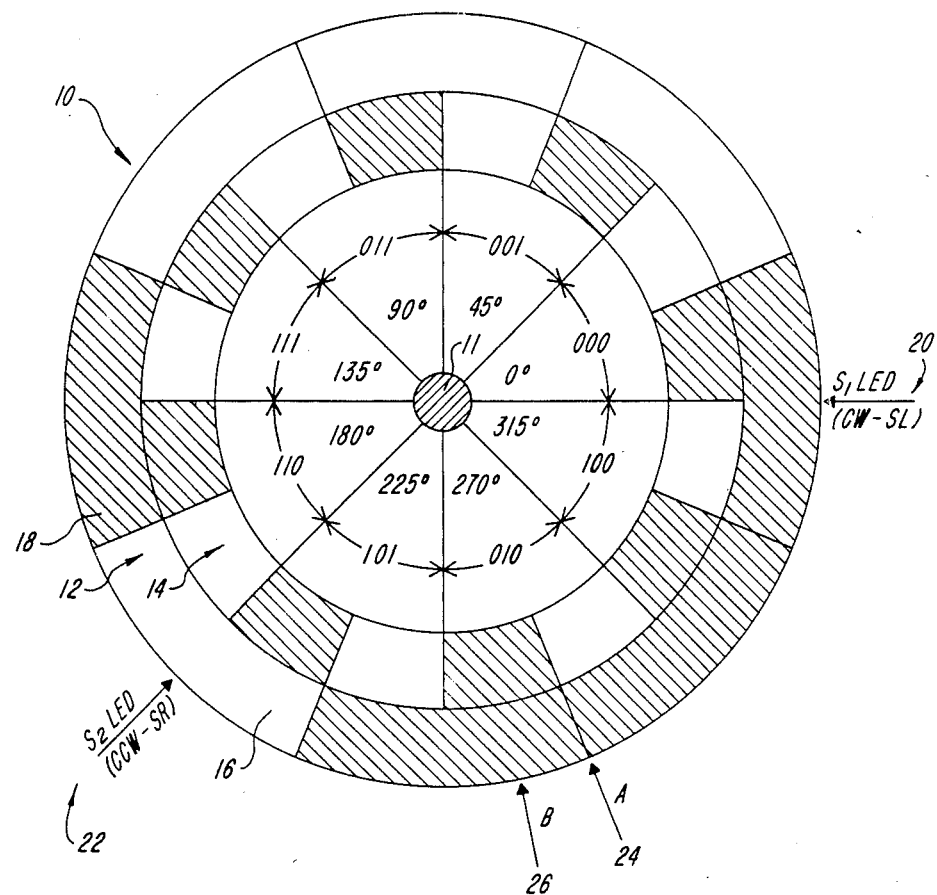
FIG. 1 shows one particular embodiment of an encoder disc having a track pattern in accordance with the present invention.

With reference to FIG. 1, rotary disc 10 is mounted on shaft 11. Rotary disc 10 is circled by an outer ring 12 and an inner ring 14. The relative locations of the tracks 12 and 14 on the disc 10 is not of primary importance, but are preferably along its outer perimeter. In the preferred embodiment, the segments of the two tracks consist of light transmissive and opaque segments, but can be of any other signaling method known in the art.

Track 14 looks like that of an incremental encoder, and it is used to generate the two least significant bits of the total absolute output word. Herein, this equal-increment track will be called the "clock" track.

The other track, track 12, is called the "code" track and will have half as many binary bit portions as the clock track 14. The code track 12 is serially coded in such a way as to provide all of the more significant bits to form the complete absolute output word. Code track 12 is shown in FIG. 1 as comprising light segments 16 and dark segments 18.

The shift register code used in the code track 12 is a serial code which provides a unique value for each incremental position of the encoder. For ease of description, a 3-bit serial code is described, but as is readily apparent, a serial code of any number of bits can be used. The number of bits chosen depends upon the resolution to which angular position is desired.

To determine the bit sequence on the code track, a serial code must first be defined. An example of a 5-bit binary encoder is given here. Such an encoder would divide one rotation into $2^5$ or 32 discrete intervals, each 11.25°. As stated above, the two least significant bits are derived from the clock track, and this will be detailed later. The three more significant bits of the shift register code, as shown below, are:

|  | $N_4$ | $N_3$ | $N_2$ |
| --- | --- | --- | --- |
| 0° | 0 | 0 | 0 |
| 45° | 0 | 0 | 1 |
| 90° | 0 | 1 | 1 |
| 135° | 1 | 1 | 1 |
| 180° | 1 | 1 | 0 |
| 225° | 1 | 0 | 1 |
| 270° | 0 | 1 | 0 |
| 315° | 1 | 0 | 0 |

Note that each word in the series of eight comes from the previous word shifted one slot to the left with a new bit entered from the right, progressing from top to bottom. In the reverse direction, moving from bottom to top, the new bit enters from the left and the others are shifted to the right. Thus, the code track carries the sequence of 0's and 1's in the order of the Most Significant Bit (MSB) column, i.e., from top to bottom: first three 0's, followed by three 1's, a 0, and a 1. This is also the sequence of bits in all three bits columns in the code sequence. When this pattern is placed on the code track 12, any three adjacent segments produces a unique sequence. Shift register codes are in themselves known, and are described, for example, in such sources as S. Golumb, *Shift Register Sequences* (Aegean Park Press 1982); S. Lin, *Error Control Coding.* (Prentice-Hall, Inc. 1983); or F. McWilliams, *The Theory of Error-Correcting Codes,* (North Holland Publishing Co. 1977). The algorithms for generating such codes all leave out the "all zeroes" word, which then must be arbitrarily inserted in the proper place in the code sequence.

The code track pattern 12 is sensed to determine the state of every successive angular bit position, and each such state is entered as a "1" or a "0" in the end slot of a shift register. As each bit state is entered, the previously sensed code track bits are all shifted into the next adjacent position in the shift register. After the shift register is filled by transversing input motion by N−2 bits, the parallel output word from the shift register plus the two least significant bits from the clock track 14 form a unique N-bit word indicating absolute input position. From then on, the N output bits continually indicate absolute input position for either direction of motion. For one direction of motion, the new absolute bit is sensed via a reticle slit 20 and entered into the right-hand end of the shift register and all previous successive bits are shifted one slot left. For the opposite direction of motion, the newly sensed bit from a second reticle slit 22 is entered into the left-hand end of the register and all previously sensed bits are shifted to the next right slot in the shift register. Thus, the pattern of bits in the shift register correspond to the same pattern on the code track between the two code pattern slits, placed N−2 bits apart on a reticle sensing plate. Thus, the N−2 more significant bits must be layed out on the code track in a succession such that each output word is the same as the previous word, only shifted one slot with a new entry at one end or the other. Also, after power is initially applied to the encoder, the input motion must traverse either way by the small amount needed to fill the shift reqister. For example, a rotary encoder that divides one rotation into 2048 increments must move by less than 2.2° to fill the register and generate the correct 11-bit output code. This is much simpler than having to rotate the up to one complete revolution necessary to find the zero-reference index in a purely incremental encoder.

As shown in FIG. 1, the clock track 14 is phase aligned with the code track 12 so as to cause the sensing circuitry to read each code track segment at its center, ensuring accurate readings of the code segments. The clock track 14 is required because, as can be seen FIG. 1, adjacent segments of the code track 12 may be of the same value (i.e. clear or opaque), thus creating ambiguity as to where one segment ends and the next begins. The A slit 24 and B slit 26, typically found on a common or separate reticle plate, are used to define the position at which the clock track is sensed. A clock signal determines when the code track is read, and the phasing of the two clock track signals determine direction of rotation.

Figure 2:
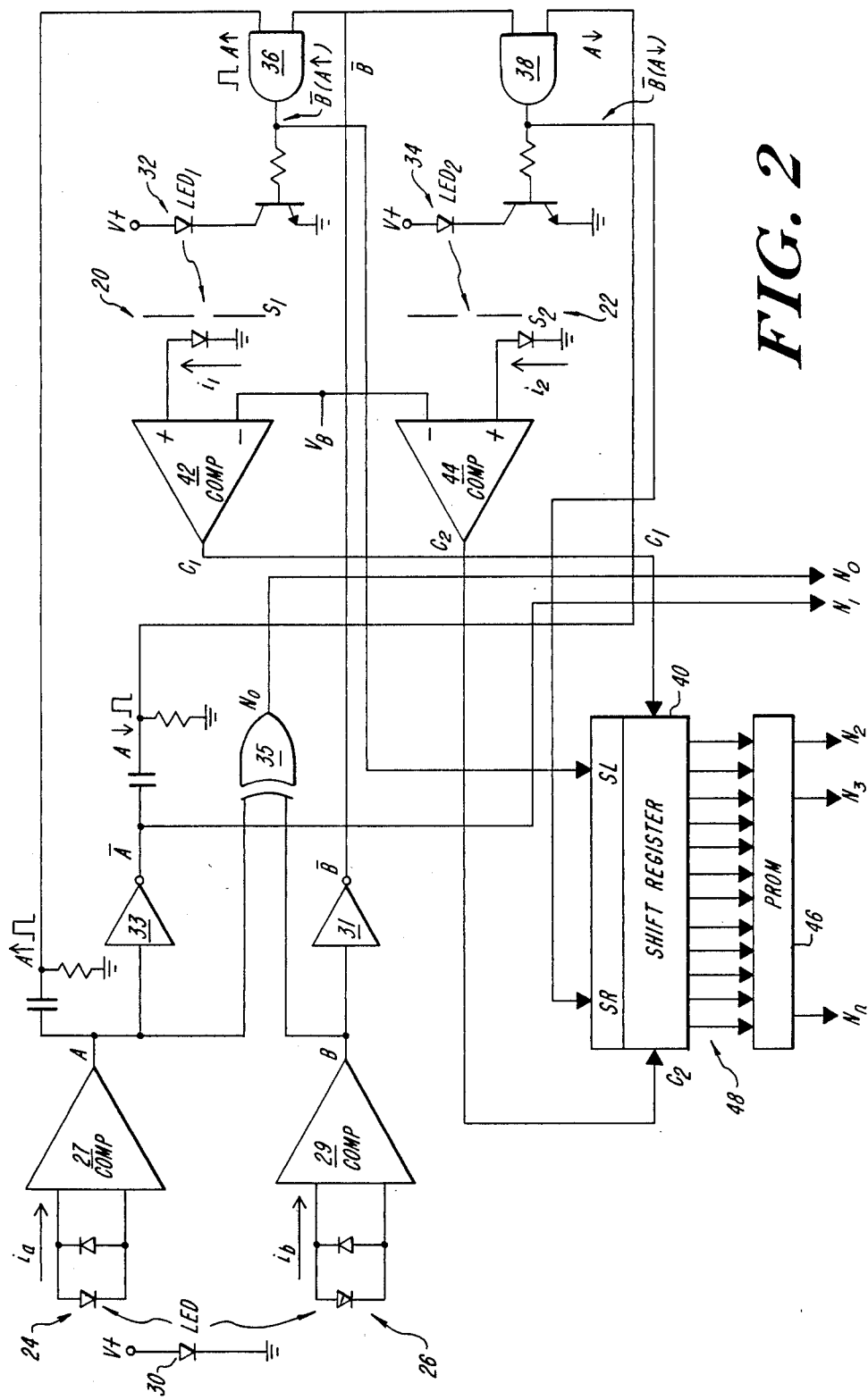
FIG. 2 is a block diagram of a circuit operative with the encoder having the disc of FIG. 1 to provide an output signal.

FIG. 2 shows a preferred circuit diagram for converting the data on the rotary disc 10 to a determination of angular shaft position. With reference to FIGS. 1 and 2, the operation of the decoder circuitry will now be explained. The light emitting diode (LED) 30 for the clock track is always on, irradiating both the A slit 24 and the B slit 26, and producing resultant signals at the outputs of A and B comparators (Schmitt Triggers) 27 and 29, respectively. In order to ensure that every bit in the code track is sensed, the LED 32 for the sensor $S_1$, 20, and the LED 34 for sensor $S_2$, 22, are each pulsed on at the instants of the transition of the A track ANDED at AND gates 36 and 38, respectively, with the B track being in the zero state, which signal is received from inverter 31. The two tracks 12 and 14 are phased to each other so that the A transitions always occur when the single-line slits at $S_1$ and $S_2$ are in the middle of a code track element. For clockwise (CW) rotation, the $S_1$ LED 32 is pulsed on by the $\overline{B} \times A \uparrow$ ($\overline{B}$ and A $\uparrow$) transitions (where A $\uparrow$ means OFF to ON), and for counter-clockwise (CW) rotation, the $S_2$ LED 38 is pulsed on by the $\overline{B} \times A \downarrow$ transitions (where A $\downarrow$ means ON to OFF). The $S_2$ slit is positioned, in the drawing, three code-track bits (or N−2 bits) behind the $S_1$ slit. FIG. 1 shows the disc in the position where $S_1$'s LED 32 is pulsed ON and radiates the middle of an opaque code track element. This is the beginning of the 000 code, because the two previous $S_1$ pulse instants have already generated the first two opaque 0's rotating clockwise. The signal from comparators 42 and 44 are indicative of the state of the code track at slots $S_1$ and $S_2$, respectively. For clockwise rotation, the signal from $S_1$ is input into the register via line $C_1$. For counter-clockwise rotation, the signal from $S_2$ is input into the shift register via line $C_2$. Further 45° clockwise rotation positions a clear bit under $S_1$ at the instant of the next $\overline{B} \times A \uparrow$ pulse, thus generating a "1" to enter the register in the right hand slot and shifting the other two "0's" left, thus causing the end of the 000 code and the beginning of the 001 code. During this same 45° rotation, the A and B bits have gone through the normal sequence of four transitions, thus dividing the 45° interval into four 11.25° increments. The A and B square waves follow the conventional incremental cycle and are converted to an absolute natural binary sequence by the simple logic shown in FIG. 2, including inverter 33 and X-OR gate 35. The direction of shift, which is dependent on the direction of disc rotation, is sensed by AND-gates 36 and 38, which produce a clock signal which triggers the shift register depending on whether the disc is rotating clockwise or counter-clockwise.

The last step is to convert the code in the shift register 40 to the desired output code, in this case, natural binary. A PROM 46 is used for this purpose, with the N−2 bit absolute word transmitted along parallel lines 48 into PROM 46, which provides the means for decoding the shift register's word. The shift register parallel output is used as addresses. The output from the PROM 46 may be of any mapping form, including natural binary, binary-coded-decimal, logarithmic, or trigonometric. The mapping does not need to be linear, so, for example, a weighted value which might represent a cam could be encoded.

Table 1 shows the successive readouts for this 5-bit example:

| SHAFT ANGLE (Degrees) | CODE TRACK REGISTER | CLOCK TRACK A | CLOCK TRACK B | [5-BIT OUTPUT WORD] PROM OUTPUT WORD | 2 LSB'S FROM CLOCK TRACK | HIGH RESOLUTION ANGLE (Degrees) |
|---|---|---|---|---|---|---|
| 0° | 000 | 1 | 0 | 000 | 00 | 00.00 |
|  | 000 | 1 | 1 | 000 | 01 | 11.25 |
|  | 000 | 0 | 1 | 000 | 10 | 22.50 |
|  | 000 | 0 | 0 | 000 | 11 | 33.75 |
| 45° | 001 | 1 | 0 | 001 | 00 | 45.00 |
|  | 001 | 1 | 1 | 001 | 01 | 56.25 |
|  | 001 | 0 | 1 | 001 | 10 | 67.50 |
|  | 001 | 0 | 0 | 001 | 11 | 78.75 |
| 90° | 011 | 1 | 0 | 010 | 00 | 90.00 |
|  | 011 | 1 | 1 | 010 | 01 | 101.25 |

-continued

| SHAFT ANGLE (Degrees) | CODE TRACK REGISTER | CLOCK TRACK A | CLOCK TRACK B | [5-BIT OUTPUT WORD] PROM OUTPUT WORD | 2 LSB'S FROM CLOCK TRACK | HIGH RESOLUTION ANGLE (Degrees) |
|---|---|---|---|---|---|---|
|  | 011 | 0 | 1 | 010 | 10 | 112.50 |
|  | 011 | 0 | 0 | 010 | 11 | 123.75 |
| 135° | 111 | 1 | 0 | 011 | 00 | 135.00 |
|  | 111 | 1 | 1 | 011 | 01 | 146.25 |
|  | 111 | 0 | 1 | 011 | 10 | 157.50 |
|  | 111 | 0 | 0 | 011 | 11 | 168.75 |
| 180° | 110 | 1 | 0 | 100 | 00 | 180.00 |
|  | 110 | 1 | 1 | 100 | 01 | 191.25 |
|  | 110 | 0 | 1 | 100 | 10 | 202.50 |
|  | 110 | 0 | 0 | 100 | 11 | 213.75 |
| 225° | 101 | 1 | 0 | 101 | 00 | 225.00 |
|  | 101 | 1 | 1 | 101 | 01 | 236.25 |
|  | 101 | 0 | 1 | 101 | 10 | 247.50 |
|  | 101 | 0 | 0 | 101 | 11 | 258.75 |
| 270° | 010 | 1 | 0 | 110 | 00 | 270.00 |
|  | 010 | 1 | 1 | 110 | 01 | 281.25 |
|  | 010 | 0 | 1 | 110 | 10 | 292.50 |
|  | 010 | 0 | 0 | 110 | 11 | 303.75 |
| 315° | 100 | 1 | 0 | 111 | 00 | 315.00 |
|  | 100 | 1 | 1 | 111 | 01 | 326.25 |
|  | 100 | 0 | 1 | 111 | 10 | 337.50 |
|  | 100 | 0 | 0 | 111 | 11 | 348.75 |

It may be convenient to count transitions after turning on power in order to provide a "READY" output signal to indicate that the shift register is correctly filled and can be read. However, this detail is not shown in the electronics diagram of FIG. 2. Another convenient output line could present a "don't read" pulse during transitions.

As is apparent from the present description, although the described embodiment is of a rotary disc encoder using a single serial code track, various other modifications and alternative implementations will occur to those versed in the art without departing from the true spirit and scope of the invention. Accordingly, it is not intended to limit the invention to what has been particularly shown and described except as indicated in the appended claims.

What is claimed is:

1. An absolute encoder providing a unique N-bit output word indicative of absolute position, comprising:
   a disc mounted for rotation about an axis, said disc having;
      a single circumferential serial code track having a plurality of circumferentially arranged binary segments, whereby each combination of N−2 adjacent segments of said code track provides N−2 bits of said output word;
      one circumferential clock code track having a plurality of circumferentially arranged alternating binary segments, whereby each combination of 2 adjacent segments of said clock track provides 2 bits of said output word;
   means for reading said clock code track to produce a clock signal indicative of the transition of said clock code and further producing 2 bits of said output word;
   means for reading said serial code track in response to said clock signal to produce N−2 bits of said output word; and
   means responsive to said means for reading said clock code track and said means for reading said serial code track to provide a unique N-bit output word representative of absolute rotary position of said disc.

2. The absolute encoder of claim 1, wherein said means to provide a code representative of position comprises a shift register means.

3. The absolute encoder of claim 1, wherein said binary segments of said serial code track are respectively light-transmitting or opaque.

4. The absolute encoder of claim 1, wherein said binary segments of said serial code track are respectively light-reflecting or non-reflective.

5. The absolute encoder of claim 1, wherein said binary segments of said serial code track are magnetic.

6. The absolute encoder of claim 1, wherein said binary segments of said serial code track are capacitive.

7. An absolute encoder comprising:
   a disc mounted for rotation about an axis, said disc including a single circumferential serial code track having binary segments, wherein a predetermined number of adjacent segments defines a unique serial code for each segment of disc rotation, and a single circumferential clock track having alternating binary segments;
   first sensing means for sensing the clock track and producing a clock signal representative of relative disc rotation and direction;
   first reticle means for defining at least two positions at which said first sensing means senses the clock track;
   second sensing means for sensing the serial code track in response to said clock signal and producing a serial code;
   second reticle means for defining at least two positions at which said second sensing means senses the serial code track;
   means for converting said serial code to a parallel word;
   means for storing said parallel word; and
   means for converting said parallel word to a signal representative of the relative angular position of said disc.

8. The apparatus of claim 7, wherein said means for storing includes a shift register and circuit means operative to transfer the serial code into a first input or a last input of the shift register in accordance with the relative phase of clock signals derived from said clock track.

9. The apparatus of claim 8, wherein the means for converting includes a memory means operative in response to an output code from the shift register to provide a code representative of the relative angular position of said disc.

10. The apparatus of claim 9, wherein the binary segments of the serial code track and of the clock track are respectively light-responsive and non-responsive; wherein the first means comprises a light source operative to direct light through the first reticle means to the clock track, and first and second light sensors for receiving light from the clock track and operative to produce the clock signal; and wherein the second means comprises a first and second light source operative to direct light through the second reticle means to the serial code track, and third and fourth light sensors for receiving light from the serial code track and operative to produce the serial code.

11. The apparatus of claim 7, further including circuit means for providing at least one bit of said serial code from the clock track.

12. An absolute encoder providing a unique N-bit output word indicative of absolute position, comprising:
  a scale mounted for relative motion with respect to a reference, said scale having:
    a single serial code track having a plurality of binary segments, wherein a predetermined number of adjacent segments defines a unique serial code for each segment of relative motion; and
    a single clock track having alternating binary segments;
  first means for sensing the clock track and producing a clock signal representative of relative movement and direction;
  second means for sensing the serial code track in response to said clock signal and producing a serial shift register code signal;
  a shift register having selectable left-to-right and right-to-left storage capabilities;
  means, responsive to the clock signal, for selectably storing said serial code in the shift register in said left-to-right or right-to-left mode depending upon relative direction of movement of said scale; and
  means for converting said serial shift register code to a signal representative of the relative position of said scale.

* * * * *